United States Patent Office 3,489,703
Patented Jan. 13, 1970

3,489,703
QUICK-DRYING MARKING PAINT
James S. Borucki, Chicago, Ill., assignor to Magnaflux Corporation, Chicago, Ill., a corporation of Delaware
No Drawing. Filed Sept. 2, 1966, Ser. No. 576,837
Int. Cl. C09d 5/00
U.S. Cl. 260—22   5 Claims

ABSTRACT OF THE DISCLOSURE

A marking paint composition for use in indicating the location of surface discontinuities by a non-destructive testing method, the composition being such as to leave a mark readily observable by the operator under daylight or "black" light. The paint composition contains an effective proportion of a water miscible solvent to render the composition as a whole somewhat miscible with water but sufficiently adherent to cause the paint to preferentially adhere to the surface even though the same is subjected to water flooding conditions. The composition comprises a liquid resin vehicle, a highly volatile solvent that is a solvent for greases and for fluorescent or visible dyes but not for the visible pigment used; a fluorescent dye; a pigment having a visible color; an extender for the pigment; and a suspending agent for the pigment and extender to reduce the settling tendencies thereof. The liquid resin vehicle comprises a film-forming resin compatible with the solvents of the composition and capable of drying quickly to a relatively non-tacky resinous film.

---

This invention relates to a quick-drying paint, and more particularly to a marking paint composition and to a method of use thereof that is suitable in the carrying out of a non-destructive testing method to indicate flaws or defects in the surfaces of metallic and non-metallic objects. The invention is especially useful in connection with the continuous testing for flaws by ultrasonic, electronic and other non-destructive testing techniques wherein the object to be tested is moved relative to the testing station and it is desired to indicate by suitable visible means the location of the otherwise invisible flaw or defect that is detected by the scanning or other means at the testing station. The marking paint of my invention affords a means for marking such flaw or defect so that it can be readily observed by the operator both under daylight, or "white" light, and under ultraviolet light, or "black" light.

In the commercial carrying out of some methods of non-destructive testing, such as ultrasonic methods of inspection, it is customary for the surfaces of the objects to be wet with water, or even flooded with water, during or following the testing operation. In such cases the marking paint should be so formulated as to possess a sufficiently high degree of adhesion to the surface of object to withstand being washed away by any excess of water present.

To satisfy such requirements, one form of my marking paint composition includes an effective proportion of a water miscible solvent to render the composition as whole somewhat miscible with water yet sufficiently adherent to the surface of the object to cause the paint to preferentially adhere thereto even though subjected to water flooding conditions.

In the application of my marking paint the liquid marking composition is preferably directed against the surface in the form of a jet or stream having sufficient force to cut through any superficial water layer and impinge directly against the surface of the object. The marking paint composition will then adhere preferentially to the surface and not be washed away even by water being subsequently flooded over the surface.

In the ultrasonic testing of objects for flaws, according to one commercial practice, water serves as the coupler between the transducer and the surface of the object. For this purpose the surface of the object is provided with a water film or coating to provide such coupling action.

It is therefore an important object of my invention to provide a marking paint that can be applied in liquid form to either dry or wet surfaces to provide an adherent resin film to the surface of the workpiece undergoing testing and furnish thereon a mark that is visible to the operator under both "white," or visible light, and "black," or invisible light in the ultraviolet range.

Other and further important objects of this invention will become apparent from the following description and appended claims.

In its broader aspects the marking paint of my invention comprises a fast drying resin vehicle, which initially is in liquid form; a highly volatile and, preferably, non-flammable solvent that is miscible with the resin vehicle and is a solvent for greases and for the fluorescent dye or pigment used but a non-solvent for the visible pigment used; a fluorescent dye; a pigment having a visible color, including white, that contrasts well with the color of the object or article undergoing test; and, preferably, an extender for such pigment; and a suspending agent for the pigment and extender to reduce the settling tendencies thereof. In order to adapt the marking paint for use where the surface of the workpiece is wet or even flooded with water, a water-miscible organic solvent is included in the paint composition as a secondary solvent. Such secondary solvent is otherwise not included in my marking paint composition.

As the source of the resin of my composition it is preferable to use a liquid resin vehicle that is available on the market, but suitable film-forming liquid resin vehicles can be made up especially for the purpose. In general, commercially available resin vehicles are employed, such as the various oil-modified alkyd resins, prepared by heating an alkyd resin with a drying oil, such as an oil having an appreciable linoleic acid content, e.g., linseed oil, soybean oil and the like. In place of an alkyd resin, other resin vehicles made by heating various resins with drying oils to form liquid resin vehicles can be used. Examples of other film-forming resins are the coumarone-indene, terpene hydrocarbon resins, and the like, which are usable in my marking paint composition, but the oil-modified alkyd resins are, in general, less expensive and more readily available on the market, and therefore preferred.

The resin vehicle selected should be one that is compatible with the primary solvent used, (and also with the secondary solvent, if one is used). The resin vehicle should also be capable of drying quickly to a relatively non-tacky, resinous film having good adherent properties toward the surface to which the marking paint is applied, regardless of whether that surface is dirty, greasy, wet with water or in other than a dry, clean condition. The adhesiveness of the resinous film formed upon drying is improved if the primary (and also the secondary) solvent in my marking paint composition is a good solvent for greases.

As the primary solvent, it is preferable to use a relatively highly volatile and non-flammable chlorinated hydrocarbon, particularly methylene chloride, or mixtures of chlorinated hydrocarbons. Methylene chloride is preferred as the primary solvent both because of its relatively high volatility and its non-flammable properties, but any of the other chlorinated hydrocarbons having comparable properties in these two respects can be used, such as trichloroethane (1,1,1-trichloroethane), trichloroethylene, chloroform and the like. Combinations of these chlorinated hydrocarbons, as well as other halogentated non-flammable, low molecular weight hydrocarbon solvents can be used provided they are good solvents for greases and miscible or compatible with the selected resin vehicle.

Preferably, the primary solvent used should have a boiling point of less than about 90° C. in order that it have the quick drying properties that are necessary for the successful use of my marking paint. The primary solvent should be one that will dissolve any grease that may be present on the surfaces of objects to be tested.

As a secondary solvent to extend the usefulness of my paint composition to include the marking of water flooded surfaces, I employ a relatively minor proportion of a water-miscible organic solvent, preferably N,N-dimethylformamide (DMF). In addition to being miscible with water, DMF is a solvent for the resin vehicle of my marking paint composition. While DMF has a relatively high boiling point, about 153° C., and has a slow rate of evaporation, it is used in such relatively small proportions,—not over 10% by volume—that the amount of DMF left in the marking paint film after evaporation of the primary solvent is practically without significant effect upon the firmness and non-tacky character of the final marking film. Acetone can be used in place of DMF and in similar proportions but is not so desirable as DMF.

As the pigment, any finely divided inorganic, paint-type of pigment can be used, but titanium dioxide is preferred because of its good whiting and hiding power and its commercial availability in many suitable grades.

As the extender, a finely powdered calcium carbonate is preferred, but various silicates can be used, such as talc and the like.

In order to reduce the tendency of the pigment and extender to settle upon standing, a suspending or antisettling agent is preferably employed, such as a pyrogenic silica. Other forms of silica and of silica aerogels in finely divided form, such that the particle size is less than 10 microns and preferably less than about 1 micron, can be used as suspending agents.

Various fluorescent dyes can be used provided that they are soluble in the resin vehicle and also in the solvent used for dissolving the fluorescent dye of my marking paint composition. Suitable fluorescent dyes includes the coumarins, e.g., the methyl amino coumarins such as 4 methyl 7 diethyl amino coumarin; naphthalimides, e.g., brilliant yellow (6G base); 1,8 naphthal N-butylimide; the stilbenes; and many others. A fluorescent dye that has been found very suitable is Calcofluor White ULA Super Conc., which is believed to be a styrylnaphthoxazole. It is quite soluble in methylene chloride and other halogenated hydrocarbons and is very effective at low concentrations.

The following composition is given to indicate the broadly operative proportions by weight of the ingredients of my quick-drying marking paint:

|  | Percent by weight |
|---|---|
| Resin vehicle (approx. 50% resin solids) | 8–20 |
| Primary solvent | 82–45 |
| Secondary solvent | 0–10 |
| Pigment | 4–16 |
| Extender | 4–16 |
| Antisettling agent | 1.5–3.5 |
| Fluorescent dye | [1] 0.03 |

[1] 0.03% min. and upwards by weight.

It will be understood that any of the substances previously mentioned for use as a resin vehicle, a primary or secondary solvent, a pigment, an extender, an antisettling agent or a fluorescent dye, can be used in the preparation of a specific formula under the broad formula and within the composition ranges just given.

As a preferred formula, the following narrower ranges, given as percentages by weight, have been found suitable:

|  | Percent by weight |
|---|---|
| Resin vehicle | 10–15 |
| Primary solvent (methylene chloride) | 60–70 |
| Secondary solvent (dimethyl formamide) | 4–10 |
| Pigment (titanium dioxide) | 8–10 |
| Extender (calcium carbonate) | 8–10 |
| Antisettling agent (Cabosil M–5) | 1.5–2.5 |
| Fluorescent dye | 0.03 |

As a specific formula for making up 1 gallon of my marking paint composition, the following formulation is given:

| Oxidizing type alkyd resin | lbs | 1.5 |
|---|---|---|
| Methylene chloride | cc | 3000 |
| Titanium dioxide | lb | 1 |
| Calcium carbonate | lb | 1 |
| Pyrogenic silica | oz | 2 |
| Fluorescent dye | gm | 2 |
| Yield (approx.) | gal | 1 |

A suitable oxidizing type alkyd resin has the following specification.

Type—Oxidizing alkyd:

| Solids by weight | percent | 49–51 |
|---|---|---|
| Viscosity (G–H) |  | Z1–Z3 |
| Weight per gal. | lbs | 8.3–8.4 |
| Color (G) | max | 6 |

Typical air-drying time @77° F.:

| Set-to-touch | min | 5–10 |
|---|---|---|
| Dry hard | min | 45–90 |

Other alkyd type resin vehicles can be used, such as a phenolic modified alkyd having comparable air-drying times at 77° F.

The use of a secondary solvent, and of an extender and antisettling agent in addition to a color pigment, is optional, but for results the use of an extender and an antisettling agent is desirable in order to extend the covering power of the selected pigment, such as titanium dioxide, and thereby reduce the cost of the marking paint, and, in the case of the antisettling agent, to facilitate suspending both the pigment and the extender (if used). Obviously, both the extender and antisettling agent are themselves pigments, in a broad sense, but they are not so effective for visible contrast purposes as is the titanium dioxide that constitutes the preferred pigment.

On the basis of the total solids content, including the approximately 50% resin solids content of the resin vehicle and the total inorganic pigment content, as broadly defined above, my composition comprises, as a broad range, between 13.5 and 45.5% by weight, and as a more preferred range, between 22.5 and 35% by weight of total solids, the balance being the liquid content of the composition.

As previously stated, the marking paint of my invention is especially suited for use in a non-destructive testing method, wherein a flaw or defect in the surface of an object, usually metallic, is detected through the use of ultrasonic, electronic or other techniques that do not of themselves alter the appearance of the surface of the object undergoing test. In that case, my marking paint composition is used in a system in which the application of the marking paint is correlated, or synchronized, with the scanning system used, so that the location of any defect or flaw is automatically marked and rendered visible both under white light and fluorescigenous radiation. In such a system, the marking paint is applied automatically as a "solid" liquid stream or jet through a suitable mechanism, using air pressure of, say 15 p.s.i.g., and a solenoid-operated gun having a restricted nozzle, to mark the location of defects or flaws that have been indicated by the scanning mechanism. This places an observable reference mark directly upon the part being scanned at the location of the defect or flaw, that the operator can observe under both daylight and "black" light.

It will be understood that modifications and variations may be effected without departing from the scope of the novel concepts of the present invention.

I claim as my invention:

1. A quick-drying pigmented, resinous liquid composition adapted for use as a marking paint on objects subjected to non-destructive testing to give a visible indication of the location of a surface defect under both white and ultra-violet light, said composition having a solids content of between 13.5 and 45.5% by weight and a liquid content making up the balance, said solids content including the resin of a film-forming liquid resin vehicle, a finely divided silica suspending agent, a pigment of a visible color contrasting with the color of the object being tested, in extender for said pigment and a fluorescent dye, and said liquid content including a primary solvent for said fluorescent dye and for said resin vehicle that has a boiling point of less than about 90° C. and that evaporates on air-drying to leave a non-tacky film and additionally including a secondary solvent that is miscible with water and is a solvent for the resin vehicle.

2. A composition as defined by claim 1, wherein, said resin vehicle is a film-forming alkyd resin in a drying oil, and said primary solvent is a highly volatile chlorinated hydrocarbon that is relatively non-flammable.

3. A composition as defined by claim 1, wherein, said primary solvent is methylene chloride, said secondary solvent is dimethylformamide, and said composition upon evaporation of said primary solvent leaves a film that adheres well to the surface of the object to which said composition has been applied even though such surface was wet with water at the time of application of the composition thereto, 4. A composition as defined by claim 3, wherein, said resin vehicle is a drying oil-modified alkyd resin in liquid form and said composition dries to an adherent film which is fluorescent and relatively non-tacky.

5. A composition as defined by claim 1, wherein, said solids content comprises, by weight,

| | Percent |
|---|---|
| Pigment | 4–16 |
| Extender | 4–16 |
| Suspending agent | 1.5–3.5 |
| Resin solids | 4–10 | and a sufficient quantity of a fluorescent dye to render the residual film visible under ultraviolet light.

References Cited

UNITED STATES PATENTS

| 2,871,697 | 2/1959 | Sockman | 252—301.2 |
| 3,030,870 | 4/1962 | Gill | 94—1.5 |
| 3,261,880 | 7/1966 | Forestier | 260—22 |
| 3,311,479 | 3/1967 | Alburger | 252—301.2 |

DONALD E. CZAJA, Primary Examiner

R. W. GRIFFIN, Assistant Examiner

U.S. Cl. X.R.

260—32.6, 32.8, 33.8, 37, 40, 41; 117—132, 161; 73—104; 252—301.2, 408